July 4, 1944.  W. R. BREND  2,352,768

PIPE LINING APPARATUS

Filed July 23, 1943   3 Sheets-Sheet 1

INVENTOR.
WILLIAM R. BREND
BY John C. Kerr
ATTORNEY

July 4, 1944.　　　W. R. BREND　　　2,352,768

PIPE LINING APPARATUS

Filed July 23, 1943　　　3 Sheets-Sheet 2

INVENTOR.
WILLIAM R. BREND
BY John C. Kerr
ATTORNEY

July 4, 1944.                W. R. BREND                2,352,768
                         PIPE LINING APPARATUS
                         Filed July 23, 1943         3 Sheets-Sheet 3

INVENTOR.
WILLIAM R. BREND
BY
John C. Kerr
ATTORNEY

Patented July 4, 1944

2,352,768

UNITED STATES PATENT OFFICE 2,352,768

PIPE LINING APPARATUS

William R. Brend, East Orange, N. J., assignor to Lock Joint Pipe Company, East Orange, N. J., a corporation of New Jersey Application July 23, 1943, Serial No. 495,826

8 Claims. (Cl. 91—44)

This invention relates to apparatus for lining pipe. It is among the objects of the present invention to provide apparatus for lining the interior of a pipe by directing a stream of concrete or other plastic material in a circular path with rotating impelling elements which form and project the stream forcefully against the interior of the pipe.

Another object of the invention is to provide apparatus having a rotating head with impelling elements arranged in balanced relation for projecting two or more streams of concrete or other plastic material from throats formed between the cylindrical surfaces of the impelling elements.

Other objects of the present invention will be hereinafter set forth in the accompanying specification and claims and demonstrated by the drawings which show by way of illustration a preferred embodiment and the principle of my invention, and what I now consider the best mode in which I have contemplated applying that principle. Other embodiments of the invention employing the same principle may be used and structural changes made as desired by those skilled in the art within the spirit of the appended claims and without departing from the present invention.

Figure 1:
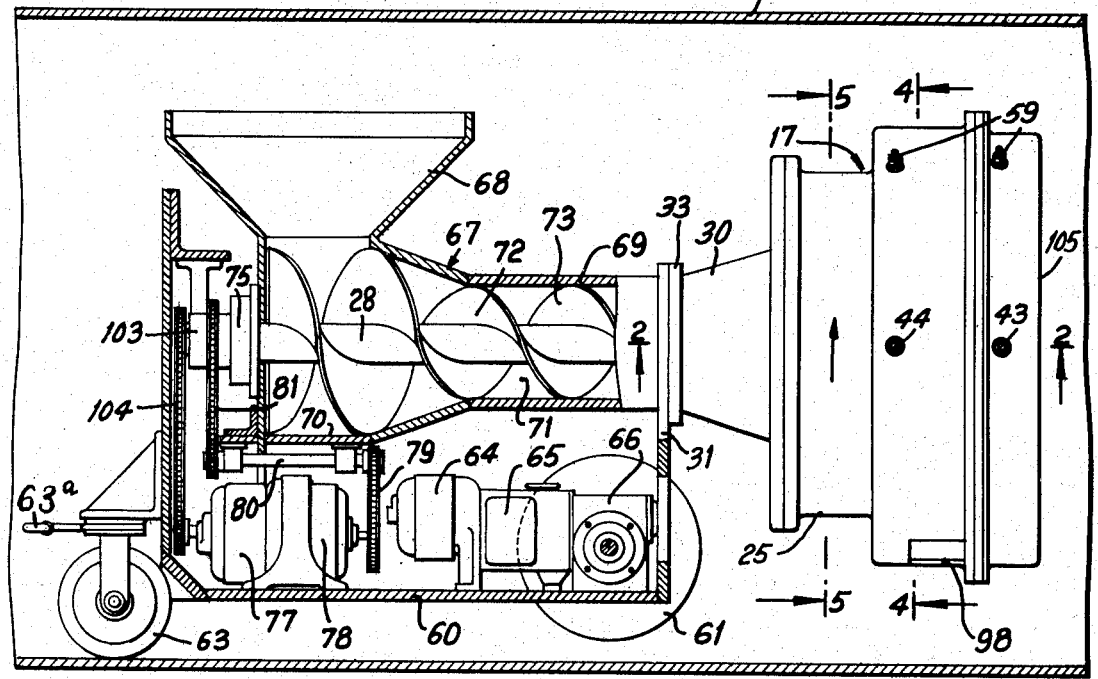
Fig. 1 shows a side elevation of the apparatus, partly in section, in position within a pipe.

The apparatus and process of this invention are concerned primarily with lining the interior of pipes with plastic materials and particularly materials which are plastic and moldable and which subsequently harden or set in a solid mass. The apparatus is particularly suitable for applying coatings of such plastic materials as contain solid matter or aggregate such as mixtures containing sand, or other concrete materials, mixed with cement. Efficacy of the apparatus resides in its capability for applying concrete at a rapid rate and under conditions which produce a well-anchored and long-wearing coating. To effect this, the apparatus is designed to project streams of plastic material at a high velocity, with the result that the interior of a pipe, however rough, is thoroughly coated and the coating is densified through impact.

Relative motion between the apparatus and the pipe is provided so as to lay helical windings or courses of plastic material upon the interior wall of a pipe in such a manner as to form a continuous lining. In the embodiment of the invention illustrated in the drawings, the apparatus is mounted for travel through a pipe line but the apparatus may be arranged to extend within a section of pipe during fabrication.

The apparatus of the present invention employs two or more moving discharge throats which form a pair of streams of plastic material and project them at high velocity in opposite directions. Each throat is formed by the cylindrical surfaces of a pair of cooperating brushes which rotate in opposite directions. The ends of the bristles form roughened surfaces which take hold of and impart kinetic energy to the material.

Figure 2:
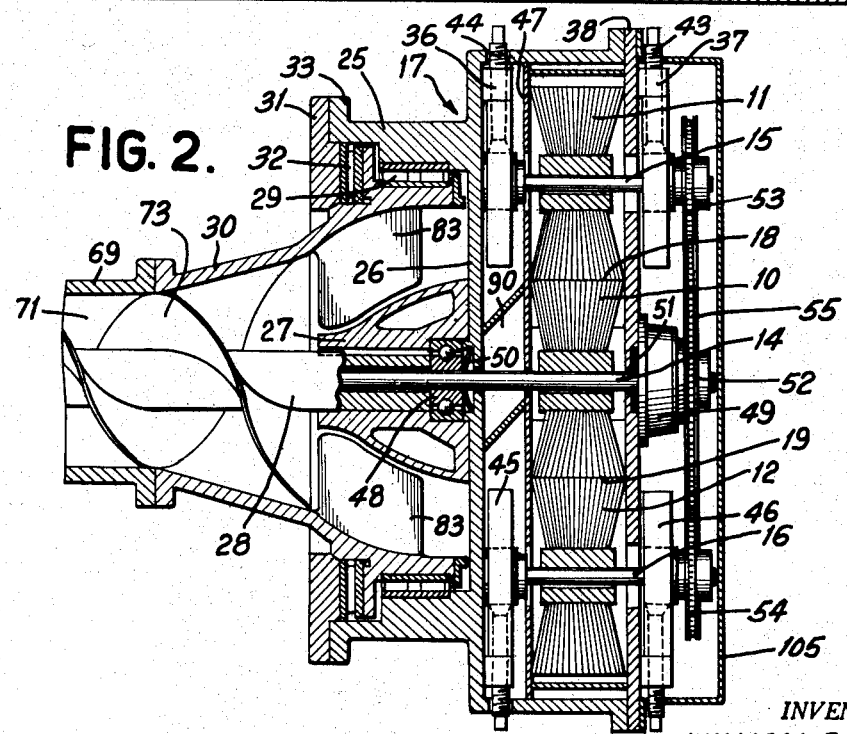
Fig. 2 is a section of the rotary head on line 2—2 of Fig. 1.

As shown in Fig. 2, the present embodiment of the invention employs three brushes 10, 11 and 12 mounted respectively on parallel shafts 14, 15 and 16 which are preferably disposed in a single plane passing through the axis of a rotary head 17. Brushes 10 and 11 are so arranged that their peripheries contact or substantially contact to form a throat or locus of discharge 18 and brush 12 is likewise arranged with respect to brush 10 to provide a second throat or locus of discharge 19 at their line of tangency. The brushes are keyed to their respective shafts and are driven by mechanism which will be described hereinafter.

Figure 3:
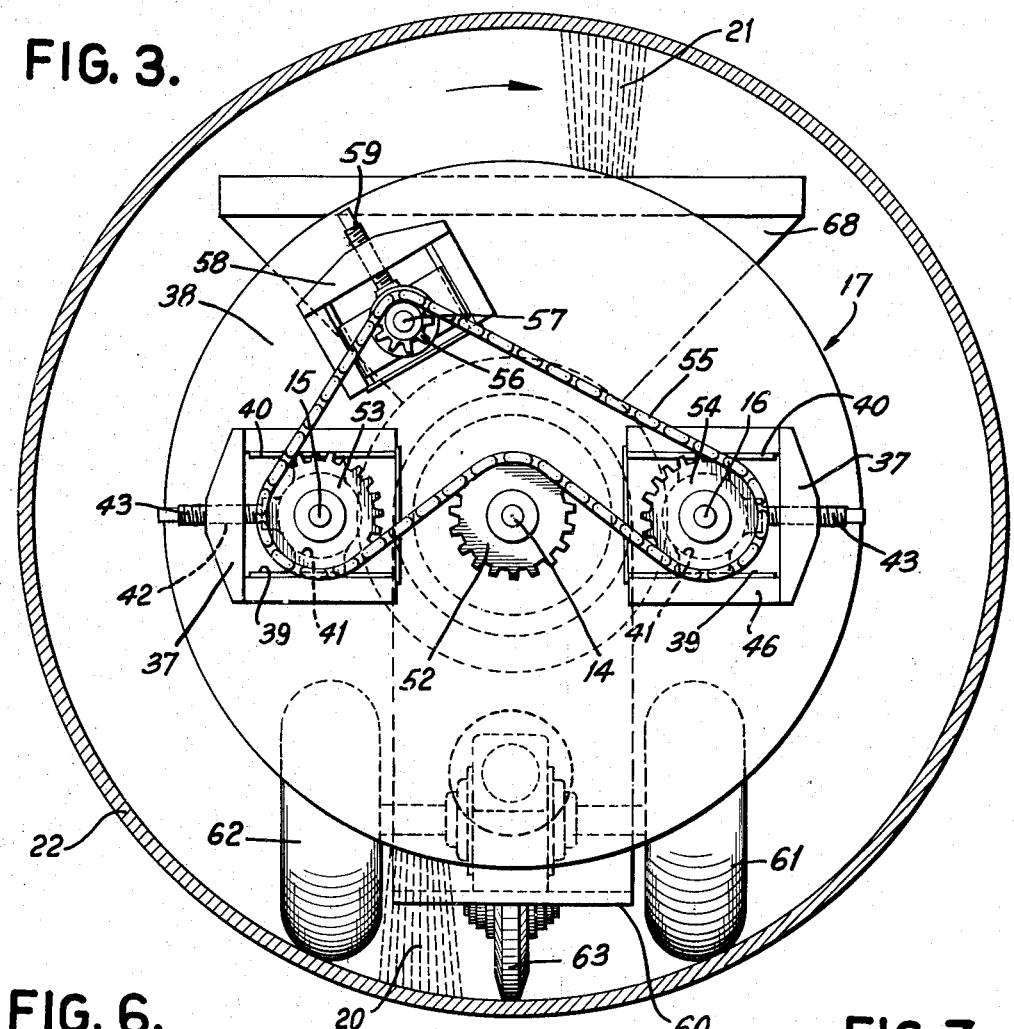
Fig. 3 is an end view of the rotary head with the end cover removed.

Brushes 11 and 12 are driven in the same direction about their respective axes, and brush 10 is rotated oppositely so that the surfaces of the brushes cooperating together to form the throat at 18 move in a common direction and the surfaces of the brushes cooperating together to form the throat at 19 also move in a common direction. The two streams projected from throats 18 and 19 are directed oppositely, as shown at 20 and 21 in Fig. 3, and they are caused to travel around the pipe 22 by the rotation of rotary head 17.

The rotary head includes a hollow cylindrical member 25 having a partitioning wall 26 intermediate its ends. The partitioning wall is secured to a conical member 27 which is in turn keyed to hollow shaft 28 and is driven thereby. The rotary head is mounted on bearings 29 between itself and the exterior of conduit 30. The front end of the rotary head carries an annular plate 31 which carries one race of radial bearings 32. The other race for these bearings is carried by a flange 33 extending from the exterior of conduit 30.

The rear end of the rotary head houses the rotary brushes 10, 11 and 12. The ends of shafts 15 and 16, which support brushes 11 and 12, respectively, are mounted in bearings which are supported in frames which permit adjustment of the bearings and the spacing between shafts 14 and 15 and shafts 14 and 16.

Adjustment is provided to make correction for the wear of the brushes and to enable adjustment of the apparatus to deliver different mortars and concretes under efficient operating conditions. For mortars of fine aggregate the peripheries of the brushes may contact, but for mortars containing coarse aggregate it is desirable to provide space between their peripheries at their points of closest approach.

Both sets of bearings and frames are illustrated in Fig. 2. Since the construction of these frames and bearings are similar, it will suffice to describe one unit. The inside frame 36 is secured to the rotary head opposite the partition plate 26, and the outside frame 37 is secured to an end plate 38 which constitutes a wall of the brush housing. Each frame has a pair of guide rails 39, 40, Fig. 3, which engage grooves in each side of bearing block 41. This bearing block supports one end of shaft 15.

The upper cross-bar of the frame has a tapped hole 42 which engages an adjusting screw 43 whose lower end is rotatably engaged with the bearing block 41. By rotating the screws 43, 44, of an associated pair of bearings, the brush-supporting shaft may be moved towards or away from shaft 14 for adjusting the spacing between the brushes. Brush-supporting shaft 16 is mounted in like manner in frames 45, 46, and is similarly adjustable. The brushes are enclosed at their sides by removable wall 38 and a detachable partitioning wall 47. Slots are provided in these walls for permitting adjustment of the position of the brush-carrying shafts towards and away from each other.

The rearward end of shaft 14 is supported in bearings 48 and 49, each of which is sealed against infiltration of water or cement by packing washers 50, 51.

Brush 18 is keyed to shaft 14 and revolves therewith. The end of shaft 14 is provided with a sprocket 52, Figs. 2 and 3, for driving shafts 15 and 16. Shafts 15 and 16 carry sprockets 53 and 54, respectively, which are engaged by a chain 55. This chain is driven from sprocket 52. Inasmuch as it is desirable to have a common linear velocity between the contacting surfaces of the brushes at 18 and 19, the diameters of the sprockets can be selected to attain this purpose. Ordinarily sprockets 52, 53 and 54 would be of the same diameter and the diameters of the three brushes would be alike.

Chain 55 also passes over sprocket 56 on shaft 57. Shaft 57 is adjustably supported in order to enable adjustment of the positions of the brush-carrying shafts 15 and 16.

Sprocket 56 serves as an idler. It is carried by bearings slidably supported in a frame 58, one at each end of shaft 57. These frames are fastened to partitioning wall 26 and end wall 38. Adjusting screw 59 serves to tighten or slacken the chain.

As shown in Fig. 1, the apparatus is mounted upon a carriage 60 having a pair of traction wheels 61, 62, and a single front wheel 63. The wheels 61 and 62 are driven through suitable connection by motor 64. A variable speed transmission 65 and a speed reduction unit 66 is provided between the motor and the traction wheels by which the speed of travel of the carriage may be controlled. The choice of speed of carriage travel depends upon the capacity of the ribbons or streams of material which are being applied and the thickness of the lining desired.

The front wheel 63 is a steering wheel, and a handle 63a is provided to control the direction of movement of the carriage. The carriage includes a casing 67 which comprises a hopper 68 and a tubular conduit 69 in communication with each other. The tubular chamber includes the lower rounded part of the hopper forming a trough 70 and an annular conveying chamber 71 which discharges through a conduit extension 30 into the rotary distributing head 17. The hopper 68 discharges directly into the conveying conduit 69 and the material in the conduit is advanced therethrough, through extension conduit 30 and to the distributing head 17 under power.

The casing 67 is stationary upon the carriage and the plastic material contained therein is advanced by a pair of worms 72, 73, mounted upon hollow shaft 28. The pitch and number of worms is optional. The center of the hollow shaft and worms is coaxial with the tubular conduit 69.

The forward end of the hollow shaft is mounted in bearing 75 at the front end of the carriage. The other end of the hollow shaft is supported indirectly from casing 67 by means of bearings 29, the rotary distributing head 17 and conical member 27 to which the distributing head and hollow shaft 28 are secured. Hollow shaft 28 is keyed to the conical member 27 and the distributing head is detachably connected to member 27 as by screws through the partitioning wall 26.

Bearings 29 are supported by the conduit 30 which extends from conduit 71. Suitable packing seals bearings 29 from infiltration of material from conduit 30.

The hollow shaft, with its worms, conical member 27 and the distributing head 17 all rotate together with respect to casing 67 and carriage 60. As seen in Fig. 1, the drive for these elements includes a motor 77, a gear reduction unit 78, sprockets and chain 79, shaft 80 and sprockets and chain 81. The ratios of the reduction unit and of the transmission are chosen so as to rotate the hollow shaft with its worms and the distributing head at a speed which is comparatively low with respect to the rotary speed of the impelling mechanism of the apparatus. By changes in gearing different angular speeds of the worms and the distributing head may be obtained.

Figure 6:
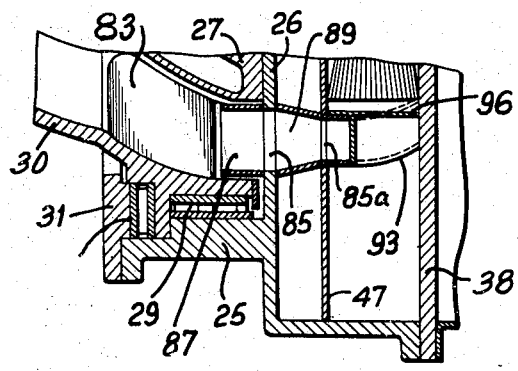
Fig. 6 is a detail through line 6—6 of Fig. 4.
Figure 5:
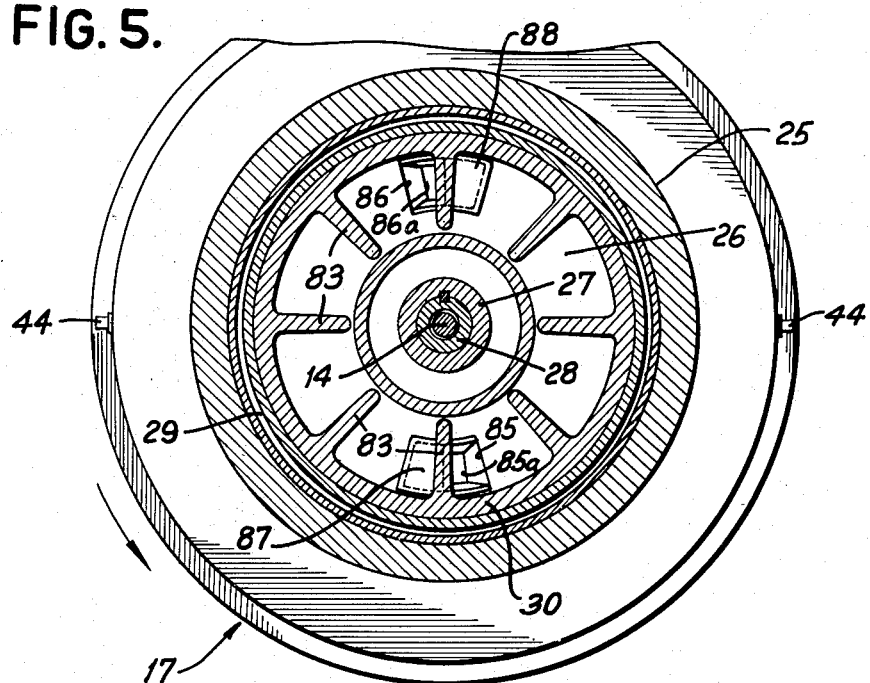
Fig. 5 is a section through the rotary head and a portion of the feeding mechanism on line 5—5 of Fig. 1.

The material is advanced through the conveying tube 69 under propulsion from the worms and is directed laterally within conduit 30 by the conical member 27. The material leaving the worms and entering the annular space outside of conical member 27 is preferably subdivided into a number of channels formed by vanes 82, Figs. 2, 5 and 6, extending inwardly from the wall of conduit extension 30. These vanes may be planar or spiral, as desired.

The material advanced by the worms is directed into the rotary head 17 through a pair of openings 85, 86 in partitioning wall 26, Figs. 4, 5, 6 and 7. In front of each of these openings there is disposed scooping members 87, 88, respectively, which extend into the annular space beyond the ends of vanes 82.

The openings 85 and 86 are connected, respectively, by inclined passageways 89, 90, which constitute conduits for conducting material between the partitioning wall 26 and the brush housing wall 47 for delivery through openings 85a and 86ª and into ingresses 91, 92 of the throats 19 and 18, respectively, of the pairs of brushes.

Figure 4:
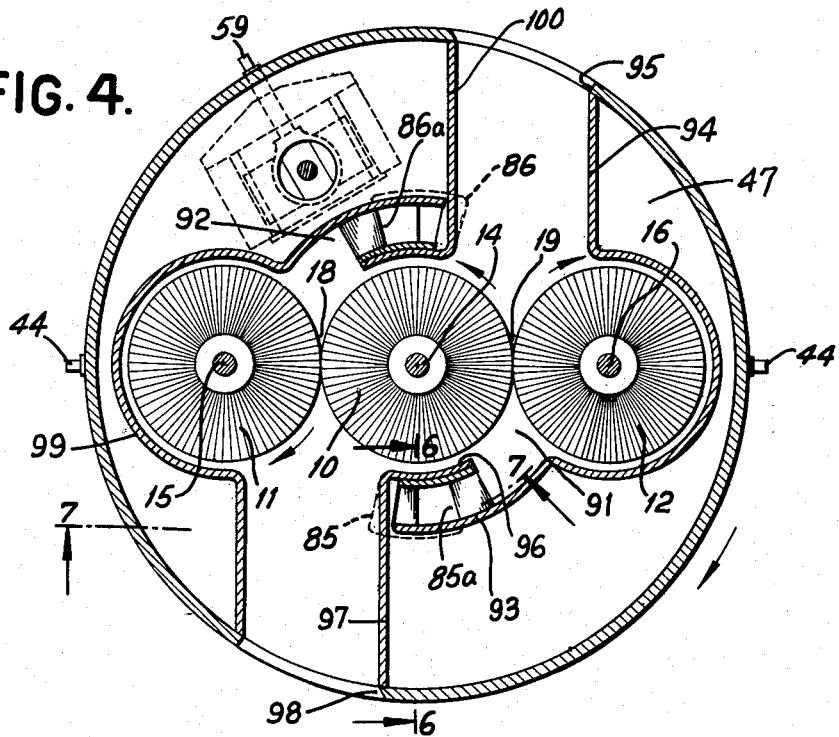
Fig. 4 is a section through the rotary head on line 4—4 of Fig. 1.

As illustrated in Fig. 4, one of the walls of the passageway constituting the ingress 91 to the brushes 10 and 12 is formed by a plate 93 enclosing the outer side of the passageway, is curved to enclose the outside of cylindrical brush 12, and then continues on as a wall 94 of an outlet opening where it is attached to the cylindrical wall of the rotary unit at 95. Another plate 96 forms an inner wall for the passageway to ingress 91 and walls-off the periphery of brush 10 for a short distance as shown in Fig. 4. This plate then continues on at 97 and is connected to the cylindrical wall of the rotary unit at 98 which is at one edge of the outlet opening through which the stream of material propelled by brushes 10 and 11 passes.

The conduit of ingress 92 between wall 47 and end plate 38 is formed in like manner by complementally-shaped strips of metal 99 and 100.

Figure 7:
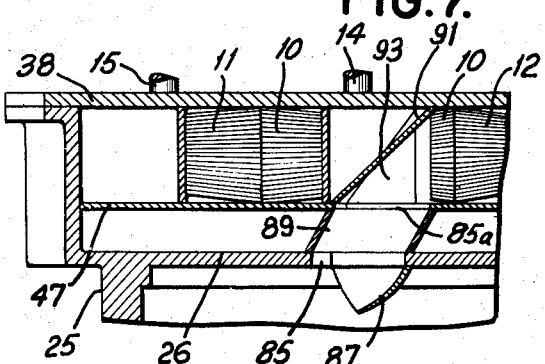
Fig. 7 is another detail through line 7—7 of Fig. 4.

The passageways immediately in advance of ingresses 91 and 92 to the respective pairs of rotating brushes are so shaped as to provide a steady flow of material across the entire widths of the brushes and they are pitched from the openings 85 and 86 respectively in partitioning wall 85 toward the brushes, like as shown in Fig. 7.

While these passageways or conduits are formed by curved and flat plates providing rectangular conduits of varying cross-section, tubing connecting with the openings 85 and 86 and curved to empty into areas of ingress 91 and 92, respectively, would be suitable for the purpose. Portions at the forward or entrance ends of such passageways are preferably helical and discharge opposite the surfaces of the brushes between parallel planes flanking the sides of the brushes so as to advance material against the brush surfaces in their directions of travel.

It is desirable that the material be fed to the brushes at a uniform rate and without interruption. All of the passageways between the brushes and the propelling worms are designed with this end in view. Another factor which affects the pressure of the material being delivered by the worms is the ratio of speed between rotating brushes and the rotating worms. This is controlled by regulating the respective speeds of the drives for the worms and for shaft 14 which operates the brushes.

Brushes 10, 11 and 12 are driven from shaft 14. The forward end of this shaft is mounted in bearing 103, Fig. 1. The drive for the shaft is attained from motor 77 through chain and sprocket connection 104.

The brushes may be of any standard construction. It is preferable that the bristles be formed from steel wire, although vegetable bristles can be used.

The apparatus of the present invention is capable of projecting substantially uniform streams of material wherein all of the particles of material are moving at substantially the same velocity. This is because the material which is presented to the brushes and projected from a locus midway between the axes of the brushes is contacted clear across both sides of a propelled ribbon or stream by surfaces which have a common linear velocity. This is particularly true when the ends of the bristles of the brushes pass quite close to each other. Substantially the same result is had when the spacing between the brushes is increased because under such condition the particles proximate the ends of the bristles impart their movement to particles nearer the midpoint of the stream. The ends of the bristles constitute a moving orifice.

In using the apparatus the operating mechanism is actuated and the carriage is advanced along the interior of a pipe at a measured rate. The determination of rate of advance through the pipe is dependent in part upon the width of the streams of plastic material being applied, and also upon the thickness of the lining layer desired. As the apparatus progresses through the pipe, the rotation of the rotary head causes the streams of plastic material to apply helical courses of lining material. It is apparent that the rotary head can be used in connection with a non-travelling casing and feeding mechanism arranged to extend with a pipe and the helical trace of plastic material applied by moving a pipe lengthwise its axis.

It is usually desirable to trowel the lining material immediately upon application, and for this purpose mechanism comprising a pair of trowels may be mounted upon the cover 105 which forms a demountable housing for the outer bearing frames and sprocket-drive for brushes 11 and 12.

What is claimed is:

1. In apparatus for applying plastic material to the interior of a pipe, the combination comprising rotatable means for distributing plastic material in a circular path, plastic material impelling means rotatably mounted on said rotatable distributing means, a second plastic material impelling means mounted for rotation on an axis coinciding with the axis of said rotatable means, both of said plastic material impelling means being in the same plane with their peripheries in tangential relationship, means for rotating said plastic material impelling means in opposite directions, means carried by said rotatable distributing means having a passageway therein for directing plastic material to the ingress to said rotatable impelling means, means for delivering plastic material to said passageway, and means for rotating said rotatable distributing means so as to continuously change the direction of discharge of plastic material being impelled from between said impelling means.

2. In apparatus for applying plastic material to the interior of a pipe, the combination comprising a rotatable member for distributing plastic material in a circular path, a rotatable impelling element mounted for rotation on an axis common to the axis of said rotatable distributing member and rotatable independently of said distributing member, a second rotatable impelling element mounted on an axis parallel to said first-named axis and carried by said distributing member, said two rotatable impelling elements being disposed in the same plane with their peripheral surfaces forming a discharge mouth therebetween, means including a conduit within said distributing member having its discharge end discharging at the ingress side of said discharge mouth for supplying plastic material to said ingress, and means for driving said rotatable impelling elements in opposite directions for impelling plastic material from the discharge mouth therebetween.

3. In apparatus for applying plastic material to the interior of a pipe, the combination comprising rotatable means for distributing plastic material in a circular path, a cylindrical brush rotatably mounted on said rotatable distributing means, means carried by said rotatable distributing means for rotating said cylindrical brush, a second cylindrical brush rotatably mounted on an axis coinciding with the axis of said rotatable distributing means and in the same plane with said first-named cylindrical brush, means for rotating said second-named cylindrical brush, means carried by said rotatable distributing means having a passageway therein for directing plastic material to the ingress to said cylindrical brushes, means for continuously delivering plastic material to said passageway, and means for rotating said rotatable distributing means to continuously change the direction of discharge of plastic material from between said rotary brushes.

4. In apparatus for applying plastic material to the interior of a pipe, the combination comprising a rotatable member for distributing plastic material in a circular path, a cylindrical brush mounted for rotation on an axis common to the axis of said rotatable distributing member, a second cylindrical brush mounted on an axis parallel to said first-named axis and carried by said distributing member, said two cylindrical brushes being disposed in the same plane with their peripheral surfaces forming a discharge mouth therebetween, means carried by said distributing member for enabling the adjustment of the spaced relationship between the axes of said cylindrical brushes to change the amount of opening of said discharge mouth, means for driving said cylindrical brushes in opposite directions, a conduit within said distributing member having its discharge end discharging at the ingress side of said discharge mouth, and means for supplying plastic material to said conduit.

5. In apparatus for applying plastic material to the interior of a pipe, the combination comprising a rotatable distributing member, means supporting said distributing member and having means for feeding plastic material to said rotatable distributing member, a rotatable brush mounted concentrically with said rotatable distributing member and having a cylindrical exterior surface, means for rotating said brush, a second rotatable brush having a cylindrical exterior surface opposite the cylindrical exterior surface of said first-named brush on a line of tangency, means for rotatably supporting said second-named brush on said distributing member, means for rotating said second-named brush, a conduit carried by said distributing member and having an entrance opening connecting with said feeding means and a discharge opening opposite the ingress side of said pair of rotatable brushes, and means for rotating said distributing member to cause the plastic material advanced by said feeding means and through said conduit to be impelled from between the cylindrical surfaces of said brushes in a continuously changing circular path.

6. In apparatus for applying plastic material to the interior of a pipe, the combination comprising a rotatable distributing member, a support for said distributing member and means associated therewith for feeding plastic material to said rotatable distributing member, a rotatable brush mounted concentrically with said rotatable distributing member and having a cylindrical exterior surface, means for rotating said brush, a second rotatable brush having a cylindrical exterior surface opposite the cylindrical exterior surface of said first-named brush and forming a discharge opening between the two cylindrical surfaces, means for rotatably supporting said second-named brush on said distributing member, means for rotating said second-named brush, a conduit carried by said distributing member and having an entrance opening connecting with said feeding means and a discharge opening opposite the ingress side of the discharge opening of said pair of rotatable brushes, the entrance portion of said conduit being pitched in such direction with respect to the direction of rotation of said distributing member as to facilitate the travel of plastic material therethrough, and means for rotating said distributing member to cause the plastic material advanced by said feeding means to be received by said conduit and delivered to the cylindrical surfaces of said brushes for projection thereby.

7. In apparatus for applying plastic material to the interior of a pipe, the combination comprising a rotatable distributing member, a rotatable brush mounted concentrically with said rotary distributing member and having a cylindrical exterior surface, a rotatable brush carried by said distributing member and having a portion of its periphery opposite the periphery of said first-named rotatable brush and providing between said rotatable brushes a discharge mouth, another rotatable brush also carried by said rotatable distributing member and having a portion of its periphery opposite the periphery of said first-named rotatable brush and providing a second discharge mouth, means for rotating all of said brushes, conduits in said rotatable distributing member, each conduit having its discharge end discharging at the ingress side of one of said discharge mouths, means for rotating said rotatable distributing member, and means for providing plastic material to said conduits in said rotatable distributing member.

8. In apparatus for applying plastic material to the interior of a pipe, the combination comprising a rotatable distributing member, means supporting said distributing member and having means for feeding plastic material to said rotary distributing member, means for rotating said distributing member, a rotatable brush mounted concentrically with said rotary distributing member and having a cylindrical exterior surface, means for rotating said brush independently of said distributing member, a rotatable brush carried by said distributing member and having a portion of its periphery opposite the periphery of said first-named rotatable brush and providing between said rotatable brushes a discharge mouth, another rotatable brush also carried by said rotatable distributing member and having a portion of its periphery opposite the periphery of said first-named rotatable brush and providing a second discharge mouth, said last two-named rotatable brushes being disposed on opposite sides of said first-named rotatable brush, means for rotating said two last-named brushes in synchronism with said first-named brush, and conduits in said rotatable distributing member, each conduit having connection with said plastic material feeding means and its discharge end discharging at the ingress side of one of said discharge mouths.

WILLIAM R. BREND.